United States Patent
Al-Haj Ali (10) Patent No.: US 12,509,532 B2
(45) Date of Patent: Dec. 30, 2025

(54) PROCESS FOR AVOIDING PHASE SEPARATION DURING SOLUTION POLYMERIZATION OF ETHYLENE-1-OCTENE COPOLYMERS

(71) Applicant: Borealis AG, Vienna (AT)

(72) Inventor: Mohammad Al-Haj Ali, Kulloo (FI)

(73) Assignee: Borealis AG, Vienna (AT)

( * ) Notice: Subject to any disclaimer, the term of this patent is extended or adjusted under 35 U.S.C. 154(b) by 678 days.

(21) Appl. No.: 17/791,987

(22) PCT Filed: Jan. 7, 2021

(86) PCT No.: PCT/EP2021/050146
§ 371 (c)(1),
(2) Date: Jul. 11, 2022

(87) PCT Pub. No.: WO2021/144178
PCT Pub. Date: Jul. 22, 2021

(65) Prior Publication Data
US 2023/0047329 A1  Feb. 16, 2023

(30) Foreign Application Priority Data
Jan. 16, 2020  (EP) .................................... 20152177

(51) Int. Cl.
*C08F 210/16* (2006.01)
*C08F 2/06* (2006.01)
(52) U.S. Cl.
CPC .............. *C08F 2/06* (2013.01); *C08F 210/16* (2013.01)

(58) Field of Classification Search
CPC ................................ C08F 210/16; C08F 2/06
See application file for complete search history.

(56) References Cited

U.S. PATENT DOCUMENTS

| | | | |
|---|---|---|---|
| 9,637,602 B2 | 5/2017 | Potter et al. | |
| 9,670,293 B2 | 6/2017 | Reznichenko et al. | |
| 9,670,347 B2 | 6/2017 | Töltsch et al. | |
| 9,708,481 B2 | 7/2017 | Wang et al. | |
| 9,745,431 B2 | 8/2017 | Potter et al. | |

(Continued)

FOREIGN PATENT DOCUMENTS

| | | |
|---|---|---|
| EP | 1 339 756 B1 | 8/2006 |
| WO | WO 2019/137634 A1 | 7/2019 |

OTHER PUBLICATIONS

Cameron, Tom, "Phase Equilibrium of polyethylene and n-hexane systems at different operating conditions", *Master's Thesis for Master of Science in Technology*, pp. 1-126 (May 17, 2016).

(Continued)

*Primary Examiner* — Rip A Lee
(74) *Attorney, Agent, or Firm* — Leydig, Voit & Mayer, Ltd.

(57) ABSTRACT

The present invention relates to a process for polymerizing ethylene-1-octene copolymers in a solution polymerization process by firstly modelling polymer systems for solution polymerization of ethylene-1-octene copolymers and then transferring pressure and temperature conditions from said modelled polymer systems to a solution polymerization process to ensure that the polymerized ethylene-1-octene copolymer is completely solved in the solvent during the polymerization process.

14 Claims, 3 Drawing Sheets

(56) References Cited

U.S. PATENT DOCUMENTS

| | | |
|---|---|---|
| 9,751,962 B2 | 9/2017 | Wang et al. |
| 9,777,142 B2 | 10/2017 | Sandholzer et al. |
| 9,802,394 B2 | 10/2017 | Cavacas et al. |
| 9,828,698 B2 | 11/2017 | Wang et al. |
| 9,890,275 B2 | 2/2018 | Sandholzer et al. |
| 9,976,020 B2 | 5/2018 | Nummila-Pakarinen et al. |
| 10,011,708 B2 | 7/2018 | Lampela et al. |
| 10,030,109 B2 | 7/2018 | Boragno et al. |
| 10,040,930 B2 | 8/2018 | Gloger et al. |
| 10,100,185 B2 | 10/2018 | Wang et al. |
| 10,100,186 B2 | 10/2018 | Wang et al. |
| 10,227,427 B2 | 3/2019 | Reichelt et al. |
| 10,450,451 B2 | 10/2019 | Wang et al. |
| 10,519,259 B2 | 12/2019 | Resconi et al. |
| 10,544,246 B2 * | 1/2020 | Jiang ............... B01J 19/06 |
| 10,844,144 B2 * | 11/2020 | Brown ............... C08F 2/06 |
| 10,870,718 B2 | 12/2020 | Denifl et al. |
| 11,078,983 B2 * | 8/2021 | Kudla ............... F16F 13/24 |
| 11,292,900 B2 | 4/2022 | Gahleitner et al. |
| 11,299,617 B2 | 4/2022 | Prieto et al. |
| 11,390,732 B2 | 7/2022 | Van Houcke et al. |
| 11,440,983 B2 * | 9/2022 | Al-Haj Ali ......... C08F 210/02 |
| 2016/0185946 A1 | 6/2016 | Sandholzer et al. |
| 2016/0194486 A1 | 7/2016 | Sandholzer et al. |
| 2016/0200838 A1 | 7/2016 | Reznichenko et al. |
| 2016/0208085 A1 | 7/2016 | Gloger et al. |
| 2016/0229158 A1 | 8/2016 | Cavacas et al. |
| 2016/0237270 A1 | 8/2016 | Wang et al. |
| 2016/0244539 A1 | 8/2016 | Resconi et al. |
| 2016/0272740 A1 | 9/2016 | Wang et al. |
| 2016/0280899 A1 | 9/2016 | Töltsch et al. |
| 2016/0304681 A1 | 10/2016 | Potter et al. |
| 2016/0311951 A1 | 10/2016 | Reichelt et al. |
| 2016/0311988 A1 | 10/2016 | Potter et al. |
| 2016/0312018 A1 | 10/2016 | Vestberg et al. |
| 2016/0312019 A1 | 10/2016 | Lampela et al. |
| 2016/0347943 A1 | 12/2016 | Wang et al. |
| 2016/0347944 A1 | 12/2016 | Wang et al. |
| 2017/0009068 A1 | 1/2017 | Kahlen et al. |
| 2017/0029980 A1 | 2/2017 | Wang et al. |
| 2017/0137617 A1 | 5/2017 | Wang et al. |
| 2017/0166711 A1 | 6/2017 | Boragno et al. |
| 2017/0218172 A1 | 8/2017 | Wang et al. |
| 2017/0313867 A1 | 11/2017 | Lampela et al. |
| 2017/0321048 A1 | 11/2017 | Nummila-Pakarinen et al. |
| 2018/0079875 A1 | 3/2018 | Braun et al. |
| 2018/0194881 A1 | 7/2018 | Denifl et al. |
| 2020/0263015 A1 | 8/2020 | Kniesel et al. |
| 2020/0270434 A1 | 8/2020 | Van Houcke et al. |
| 2020/0277479 A1 | 9/2020 | Jerabek et al. |
| 2020/0308353 A1 | 10/2020 | Jerabek et al. |
| 2020/0347216 A1 | 11/2020 | Kniesel et al. |
| 2020/0392321 A1 | 12/2020 | Gahleitner et al. |
| 2021/0114352 A1 | 4/2021 | Oderkerk et al. |
| 2021/0171749 A1 | 6/2021 | Kumar et al. |
| 2021/0171750 A1 | 6/2021 | Gahleitner et al. |
| 2021/0214527 A1 | 7/2021 | Gahleitner et al. |
| 2021/0214533 A1 | 7/2021 | Kulshreshtha et al. |
| 2021/0238376 A1 | 8/2021 | Kahlen et al. |
| 2021/0253836 A1 | 8/2021 | Gahleitner et al. |
| 2021/0269560 A1 | 9/2021 | Krallis et al. |
| 2021/0324189 A1 | 10/2021 | Prieto et al. |
| 2021/0332227 A1 | 10/2021 | Wang et al. |
| 2021/0347971 A1 | 11/2021 | Wang et al. |
| 2022/0033631 A1 | 2/2022 | Gloger et al. |
| 2022/0135779 A1 | 5/2022 | Wang et al. |
| 2022/0204719 A1 | 6/2022 | Vijay |
| 2022/0227965 A1 | 7/2022 | Ruemer et al. |
| 2022/0251256 A1 | 8/2022 | Wang et al. |
| 2022/0289955 A1 | 9/2022 | Kahlen et al. |
| 2022/0306844 A1 | 9/2022 | Kahlen et al. |
| 2023/0046086 A1 * | 2/2023 | Al-Haj Ali ......... C08F 2/06 |

OTHER PUBLICATIONS

Chen et al., "Density-Tuned Polyolefin Phase Equilibria. 1. Binary Solutions of Alternating Poly(ethylene-propylene) in Subcritical and Supercritical Propylene, 1-Butene, and 1-Hexene. Experiment and Flory-Patterson Model", *Macromolecules*, vol. 25: pp. 3089-3096 (Dec. 17, 1991).
Chen et al., "Density-Tuned Polyolefin Phase Equilibria. 2. Multicomponent Solutions of Alternating Poly(ethylene-propylene) in Subcritical and Supercritical Olefins. Experiment and SAFT Model", *Macromolecules*, vol. 25: pp. 4987-4995 (May 11, 1992).
Flory, Paul J., "Thermodynamics of Heterogeneous Polymers and Their Solutions", *The Journal of Chemical Physics*, vol. 12(11): pp. 425-438 (Oct. 12, 1944).
Folie et al., "Phase Equilibria in High-Pressure Polyethylene Technology", *Ind. Eng. Chem. Res.*, vol. 34(5): pp. 1501-1516 (Nov. 29, 1994).
Fredenslund, Aa., "UNIFAC and Related Group-Contribution Models for Phase Equilibria", *Fluid Phase Equilibria* 52, pp. 135-150 (1989).
Gauter et al., "Modeling polyethylene-solvent mixtures with the Sanchez-Lacombe equation", *Fluid Phase Equilibria* 183-184, pp. 87-97 (2001).
Gross et al., "Perturbed-Chain SAFT: An Equation of State Based on a Pertubation Theory for Chain Molecules", *Ind. Eng. Chem. Res.*, vol. 40(4): pp. 1244-1260 (Jan. 18, 2001).
Gross et al., "Modeling Copolymer Systems Using the Perturbed-Chain SAFT Equation of State", *Ind. Eng. Chem. Res.*, vol. 42(6): pp. 1266-1274 (Feb. 11, 2003).
Kontogeorgis et al., "Prediction of Liquid-Liquid Equilibrium for Binary Polymer Solutions with Simple Activity Coefficient Models", *Ind. Eng. Chem. Res.*, vol. 34(5): pp. 1823-1834 (Jan. 2, 1995).
De Loos et al., "Fluid Phase Equilibria in the System Polyethylene + Ethylene. 1. Systems of Linear Polyethylene + Ethylene at High Pressure", *Macromolecules*, vol. 16(1): pp. 111-117 (Feb. 5, 1982).
Maloney et al., "Solubility of Ethylene in Liquid, Low-Density Polyethylene at Industrial-Separation Pressures", *Ind. Eng. Chem., Process Des. Dev.*, vol. 15(1): pp. 216-220 (Sep. 2, 1975).
Nagy et al., "High pressure phase equilibria in the systems linear low density polyethylene + n-hexane and linear low density polyethylene + n-hexane + ethylene: Experimental results and modelling with the Sanchez-Lacombe equation of state", *J. of Supercritical Fluids* 37, pp. 115-124 (Aug. 24, 2005).
Nagy et al., "High-pressure phase equilibria in the system linear low density polyethylene + isohexane: Experimental results and modelling", *J. of Supercritical Fluids* 40, pp. 125-133 (2007).
Pedrosa et al., "Phase Equilibria Calculations of Polyethylene Solutions from SAFT-Type Equations of State", *Macromolecules*, vol. 39(12): pp. 4240-4246 (Apr. 18, 2006).
Song et al., "Liquid-Liquid Phase Diagrams for Binary Polymer Solutions from a Perturbed Hard-Sphere-Chain Equation of State", *Chemical Engineering Science*, pp. 1-37 (Sep. 1, 1993).
Szydlowski et al., "A new apparatus for the detection of phase equilibria in polymer solvent systems by light scattering", *Review of Scientific Instruments* 63, vol. 2: pp. 1717-1725 (Nov. 4, 1991).
Tork et al., "Modelling of high-pressure phase equilibria using the Sako-WU-Prausnitz equation of state I. Pure-components and heavy n-alkane solutions", *Fluid Phase Equilibria*, vol. 163: pp. 61-77 (May 15, 1999).
Tork et al., "Modelling of high-pressure phase equilibria using the Sako-Wu-Prausnitz equation of state II. Vapour-liquid equilibria and liquid-liquid equilibria in polyolefin systems", *Fluid Phase Equilibria* 163, pp. 79-98 (May 15, 1999).
https://en.wikipedia.org/wiki/PC-SAFT, "PC-SAFT", pp. 1-2, retrieved on Oct. 5, 2022.
European Patent Office, International Search Report issued in International Application No. PCT/EP2021/050146 (Apr. 28, 2021).
European Patent Office, Written Opinion of the International Searching Authority issued in International Application No. PCT/EP2021/050146 (Apr. 28, 2021).
The International Bureau of WIPO, International Preliminary Report on Patentability issued in International Application No. PCT/EP2021/050146 (Jul. 19, 2022).

(56) References Cited

OTHER PUBLICATIONS

European Patent Office, Extended European Search Report issued in European Patent Application No. 20152177.0 (Jul. 29, 2020).

* cited by examiner

PROCESS FOR AVOIDING PHASE SEPARATION DURING SOLUTION POLYMERIZATION OF ETHYLENE-1-OCTENE COPOLYMERS

CROSS-REFERENCE TO RELATED APPLICATIONS

This patent application is the U.S. national phase of International Application No. PCT/EP2021/050146, filed on Jan. 7, 2021, which claims the benefit of European Patent Application No. 20152177.0, filed Jan. 16, 2020, the disclosures of which are incorporated herein by reference in their entireties for all purposes.

The present invention relates to a process for polymerizing ethylene-1-octene copolymers in a solution polymerization process by firstly modelling polymer systems for solution polymerization of ethylene-1-octene copolymers and then transferring pressure and temperature conditions from said modelled polymer systems to a solution polymerization process to ensure that the polymerized ethylene-1-octene copolymer is completely solved in the solvent during the polymerization process.

TECHNICAL BACKGROUND

Figure 1:
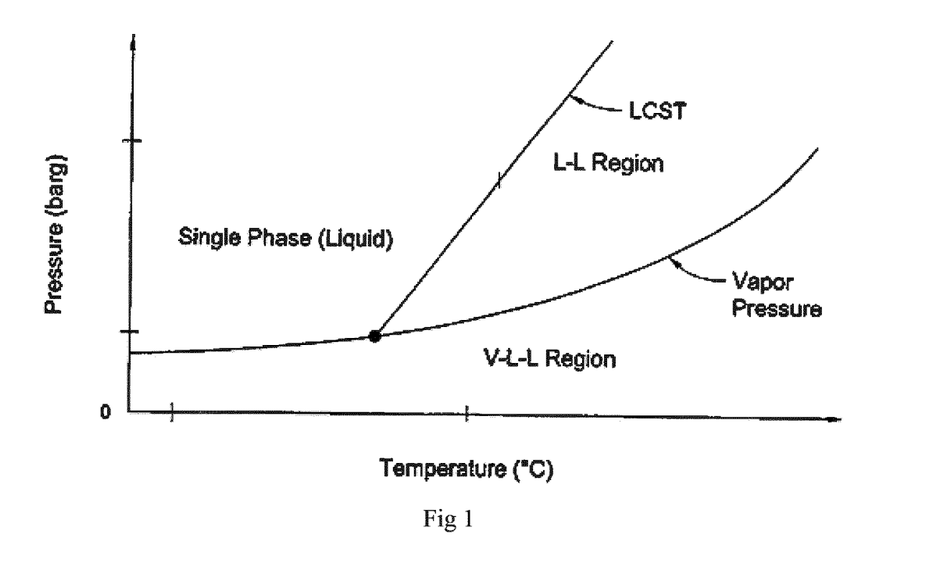
FIG. 1 shows a phase diagram as P,T curves of a multicomponent system such as a polymer composition. The LCST curve, also known as cloud point curve shows the phase separation curve between the single liquid phase and the two liquids-L-L-phase.

The production of linear low density polyethylene (LL-DPE) is typically carried out in solution polymerization. In this type of polymerization, ethylene monomer, optional comonomers and a polymerization catalyst are dissolved in an inert hydrocarbon solvent and polymerized to form an ethylene based polymer. The polymer properties thereby are usually adapted by altering the ethylene and comonomer ratios. In solution polymerization it is important to keep the solution homogenous through the polymerization process, i.e. that through the complete polymerization process the solution is maintained a single phase liquid system in order to ensure the productivity of the process. In a two phase liquid system (L-L system) the monomers would enrich in one liquid phase and the produced ethylene based polymer would enrich in the second liquid phase. In order to maintain the polymerization process in a single phase liquid system the polymerization conditions, especially polymerization temperature and pressure, need to chosen accordingly. FIG. 1 shows a typical phase diagram with the different phases depending on the polymerization pressure and temperature. FIG. 1 is taken and adapted from FIG. 2 of EP 1 339 756 B 1. The border between the single phase liquid region and the two phase L-L region is marked by the lower critical solution temperature (LCST) curve, also identified as cloud-point curve. The LCST curve shows the p, T conditions of the transfer from the single phase liquid region to the two phase liquid region (L-L region). Thereby, the LCST curve in not only affected by the polymerization conditions but also by the monomer and comonomer ratios and the polymer concentration in the solution.

During the polymerization process changes in the conditions regarding the temperature, pressure or polymer concentration inside the equipment, especially the polymerization reactor or the downstream heat exchanger, can cause phase separation, especially if these changes happen uncontrolled. These changes then can easily cause disturbances in the polymerization process. It is thus essential to understand how a change of the polymerization conditions can effect the phase system in the process and which measured need to be taken to maintain a single phase liquid system during operation.

For each solution polymerization for polymerizing a low density polyethylene with a specific set of polymer properties the polymerization conditions need to be experimentally determined in order to ensure maintenance of a single phase liquid system not only in the polymerization reactor but also in the downstream processing steps, especially the downstream heat exchanger.

Experimental determination of the polymerization conditions afford elaborate series experiments for each and every set of the monomer and comonomer ratios and the polymer concentration in the solution. It is therefore of interest to establish thermodynamic models or mathematical correlations which describe such polymer systems that show single phase liquid regions in the p, T phase diagrams in correlation to the monomer and comonomer ratios and the polymer concentration in the solution.

Such models and correlations would significantly reduce preparatory work before establishing a solution polymerization process and thus would significantly reduce production costs, would allow for faster adaptation of solution polymerization processes and would increase production safety by reducing unexpected disturbances of the polymerization process.

The present invention proposes process for polymerizing ethylene-1-octene copolymers in a solution polymerization process by firstly modelling polymer systems for solution polymerization of ethylene-1-octene copolymers and then transferring pressure and temperature conditions from said modelled polymer systems to a solution polymerization process to ensure that the polymerized ethylene-1-octene copolymer is completely solved in the solvent during the polymerization process.

SUMMARY OF THE INVENTION

The present invention relates to process for polymerizing ethylene-1-octene copolymers in a solution polymerization process by firstly modelling polymer systems for solution polymerization of ethylene-1-octene copolymers and then transferring pressure and temperature conditions from said modelled polymer systems to a solution polymerization process, comprising the steps of
  a) Determining the cloud points on the LCST curve for two or more model compositions of a specific ethylene-1-octene copolymer grade comprising ethylene monomer, 1-octene monomer, ethylene-1-octene copolymer of a specific grade and solvent, whereby the model compositions differ in their weight amounts of at least one of ethylene monomer, 1-octene monomer, ethylene-1-octene copolymer;
  b) Developing a correlation for interpolating cloud points for compositions of said specific ethylene-1-octene copolymer grade comprising ethylene monomer, 1-octene monomer, ethylene-1-octene copolymer of said specific grade and solvent with different weight amounts of at least one of the ethylene monomer, 1-octene monomer, ethylene-1-octene copolymer of said specific grade from the cloud points determined for said model compositions;
  c) Predicting phase separation for said specific ethylene-1-octene copolymer grade by interpolating the cloud points from said correlation for a composition of said specific ethylene-1-octene copolymer grade comprising ethylene monomer, 1-octene monomer, ethylene-1-octene copolymer of said specific grade with given weight amounts of at least one of ethylene monomer, 1-octene monomer, ethylene-1-octene copolymer;

d) Selecting pressure and temperature conditions, which in the predicted phase separation data show that the ethylene-1-octene copolymer is completely solved in the solvent;
e) Adjusting at least one parameter selected from the process temperature and pressure in at least one solution polymerization reactor, and optionally the first heat exchanger downstream from the at least one solution polymerization reactor, to said selected pressure and temperature conditions during a solution polymerization process of an ethylene-1-octene copolymer of said specific grade, and
f) Polymerizing ethylene monomer and 1-octene monomer in a solvent in said at least one solution polymerization reactor at the adjusted process temperature and/or pressure in the presence of a polymerization catalyst to obtain an ethylene-1-octene copolymer of said specific grade, which is completely solved in said solvent.

Further, the present invention relates to the use of a correlation for interpolating cloud points from the cloud points on the LCST curve determined for two or more model compositions of a specific ethylene-1-octene copolymer grade comprising ethylene monomer, 1-octene monomer, ethylene-1-octene copolymer of a specific grade and solvent, whereby the model compositions differ in their weight amounts of at least one of ethylene monomer, 1-octene monomer, ethylene-1-octene copolymer for adjusting at least one of the parameters selected from the process temperature and pressure, and maintaining a single phase liquid system during a solution polymerization process for polymerizing an ethylene-1-octene copolymer of said specific grade.

Definitions

The lower critical solution temperature (LCST) is the critical temperature below which the components of a mixture are miscible for all compositions. In a phase diagram the LCST is plotted as a P,T curve of the lower critical solution temperature showing the P,T conditions of phase transfer from single liquid phase to liquid-liquid two phase (phase separation). Said LCST curve is also known as cloud point curve.

The cloud point is the point on the LCST curve showing for a given lower critical solution temperature (LCST) the pressure of phase separation.

An ethylene-1-octene copolymer of a specific grade is an ethylene-1-octene copolymer having a specific set of properties selected from 1-octene content, density, melt flow rate, weight average molecular weight, number average molecular weight, molecular weight distribution, modality etc., which is usually polymerized using a solution polymerization process with specific polymerization conditions and a specific polymerization catalyst.

In thermodynamics, an equation of state (EoS) is a thermodynamic equation relating state variables, which describe the state of matter under a given set of physical conditions, such as pressure, volume, temperature (PVT). Equations of state are useful in describing the properties of fluids and mixtures of fluids, and/or solids.

Perturbed-chain statistical associating fluid theory (PC-SAFT) equation is an equation of state that is based on statistical associating fluid theory (SAFT). Like other SAFT equations of state, it makes use of statistical mechanical methods (in particular perturbation theory). However, unlike earlier SAFT equations of state that used spherical particles as a reference, it uses a hard chain reference fluid (https://en.wikipedia.org/wiki/PC-SAFT).

GENERAL DESCRIPTION OF THE INVENTION

The present invention relates to process for polymerizing ethylene-1-octene copolymers in a solution polymerization process by firstly modelling polymer systems for solution polymerization of ethylene-1-octene copolymers and then transferring pressure and temperature conditions from said modelled polymer systems to a solution polymerization process, comprising the steps of
a) Determining the cloud points on the LCST curve for two or more model compositions of a specific ethylene-1-octene copolymer grade comprising ethylene monomer, 1-octene monomer, ethylene-1-octene copolymer of a specific grade and solvent, whereby the model compositions differ in their weight amounts of at least one of ethylene monomer, 1-octene monomer, ethylene-1-octene copolymer;
b) Developing a correlation for interpolating cloud points for compositions of said specific ethylene-1-octene copolymer grade comprising ethylene monomer, 1-octene monomer, ethylene-1-octene copolymer of said specific grade and solvent with different weight amounts of at least one of the ethylene monomer, 1-octene monomer, ethylene-1-octene copolymer of said specific grade from the cloud points determined for said model compositions;
c) Predicting phase separation for said specific ethylene-1-octene copolymer grade by interpolating the cloud points from said correlation for a composition of said specific ethylene-1-octene copolymer grade comprising ethylene monomer, 1-octene monomer, ethylene-1-octene copolymer of said specific grade with given weight amounts of at least one of ethylene monomer, 1-octene monomer, ethylene-1-octene copolymer;
d) Selecting pressure and temperature conditions, which in the predicted phase separation data show that the ethylene-1-octene copolymer is completely solved in the solvent;
e) Adjusting at least one parameter selected from the process temperature and pressure in at least one solution polymerization reactor, and optionally the first heat exchanger downstream from the at least one solution polymerization reactor, to said selected pressure and temperature conditions during a solution polymerization process of an ethylene-1-octene copolymer of said specific grade, and f) Polymerizing ethylene monomer and 1-octene monomer in a solvent in said at least one solution polymerization reactor at the adjusted process temperature and/or pressure in the presence of a polymerization catalyst to obtain an ethylene-1-octene copolymer of said specific grade, which is completely solved in said solvent.

In a first step of the inventive method the cloud points of model compositions are determined on the LCST curve. Thereby, the cloud points are P,T points in a P,T phase diagram in which phase separation from one phase liquid systems to two phase L-L-liquid systems are observed.

For determining the cloud points model compositions of a specific ethylene-1-octene copolymer grade are produced. Said ethylene-1-octene copolymer grade is the grade for which the phase separation conditions shall be predicted by means of the inventive method.

The ethylene-1-octene copolymer preferably is a linear low density ethylene-1-octene copolymer, more preferably a very low linear low density ethylene-1-octene copolymer, and most preferably an ethylene-1-octene plastomer.

Thereby, a plastomer is a polymer which combines the qualities of elastomers and plastics, such as rubber-like properties with the processing abilities of plastic.

The ethylene-1-octene copolymer grade preferably has a density of from 850 kg/m$^3$ to 960 kg/m$^3$, more preferably from 855 kg/m$^3$ to 950 kg/m$^3$ and most preferably from 860 kg/m$^3$ to 940 kg/m$^3$, determined according to ISO 1183D.

Further, the ethylene-1-octene copolymer grade preferably has a melt flow rate MF R2, determined according to ISO 1133 at a load of 2.16 kg and a temperature of 190° C. of from 0.1 to 100 g/10 min, more preferably from 0.5 to 75 g/10 min and most preferably from 1.0 to 50 g/10 min.

The melting point (measured with DSC according to ISO 11357-3) of the ethylene-1-octene copolymer grade is below 130° C., preferably below 120° C., more preferably below 110° C. and most preferably below 100° C.

Furthermore the ethylene-1-octene copolymer grade has a glass transition temperature Tg (measured with DMTA according to ISO 6721-7) of below −25° C., preferably below −30° C., more preferably below −35° C.

The ethylene-1-octene copolymer grade preferably has an ethylene content from 60.0 to 95.0 wt %, preferably from 65.0 to 90.0 wt % and more preferably from 70.0 to 88.0 wt %.

The molecular mass distribution Mw/Mn of the ethylene-1-octene copolymer grade is most often below 4.0, such as 3.8 or below, but is at least 1.7. It is preferably between 3.5 and 1.8.

The ethylene-1-octene copolymer grade is produced in a solution polymerization process, which can be a one stage or two stage solution polymerization process.

Preferably said ethylene-1-octene copolymer grade is prepared by high temperature solution polymerization process at temperatures higher than 100° C.

Such a process is essentially based on polymerizing the monomer and a suitable comonomer in a liquid hydrocarbon solvent in which the resulting polymer is soluble. The polymerization is carried out at a temperature above the melting point of the polymer, as a result of which a polymer solution is obtained. This solution is flashed in order to separate the polymer from the unreacted monomer and the solvent. The solvent is then recovered and recycled in the process.

Preferably the solution polymerization process is a high temperature solution polymerization process, using a polymerization temperature of higher than 100° C. Preferably the polymerization temperature is at least 110° C., more preferably at least 150° C. The polymerization temperature can be up to 250° C., preferably up to 220° C. The pressure in such a solution polymerization process is preferably in a range of 10 to 300 bar, preferably 15 to 275 bar and more preferably 20 to 250 bar.

The solvent is preferably a liquid hydrocarbon solvent, more preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

The solvent can also comprise mixtures of said hydrocarbon solvents.

Suitably, the ethylene-1-octene copolymer grade is polymerized in the presence of a polymerization catalyst, which is selected from vanadium oxide catalysts or single-site catalysts, e.g. metallocene or constrained geometry catalysts. Especially preferred are single-site catalysts, such as metallocene or constrained geometry catalysts and mostly preferred are metallocene catalysts.

The model compositions are usually prepared by solving ethylene monomer, 1-octene monomer, ethylene-1-octene copolymer of said specific grade in a solvent.

The solvent is preferably a liquid hydrocarbon solvent, more preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

It is especially preferred that the same solvent is used as in the solution polymerization process for producing said specific ethylene-1-octene copolymer grade.

The amount of ethylene-1-octene copolymer in the model composition is preferably in the range of from 5 wt % to 45 wt %, more preferably in the range of from 7.5 to 42 wt % and most preferably in the range of from 10 to 40 wt %, based on the total amount of the model composition.

The amount of ethylene monomer in the model composition is preferably in the range of from 0.1 wt % to 5.0 wt %, more preferably in the range of from 0.5 to 4.0 wt %, most preferably in the range of from 0.8 to 3.0 wt %, based on the total amount of the model composition.

The amount of 1-octene monomer in the model composition is preferably in the range of from 1.0 wt % to 30.0 wt %, more preferably in the range of 2.0 to 25.0 wt %, and most preferably in the range of from 2.5 wt % to 21.0 wt %, based on the total amount of the model composition.

The model compositions can further comprising nitrogen in an amount of from 0.00 wt % to 2.50 wt %, more preferably in the range of from 0.05 wt % to 1.50 wt %, most preferably in the range of from 0.10 wt % to 1.00 wt %, based on the total amount of the model composition.

Thereby, the model compositions can further comprise different weight amounts of nitrogen.

It is preferred that the model compositions consist of ethylene monomer, 1-octene monomer, ethylene-1-octene copolymer of said specific grade, solvent and optionally nitrogen.

By reducing the components of the model compositions to the main components of a polymerization composition in a polymerization reactor, i.e. ethylene monomer, 1-octene monomer, ethylene-1-octene copolymer of said specific grade, solvent and optionally nitrogen, the influence of minor components, such as catalyst, oligomers or chain transfer agent, if present, on the cloud points is neglected. It has, however, been found that a good correlation between the cloud points of said model compositions and the real polymerization compositions is obtained.

The cloud points of two or more model compositions of one ethylene-1-octene copolymer of a specific grade are determined. Thereby, the cloud points of two or three or more model compositions of one ethylene-1-octene copolymer of a specific grade can determined, preferably of two or three model compositions. These model compositions differ in their weight amounts of at least one of ethylene monomer, 1-octene monomer, ethylene-1-octene copolymer, preferably in their weight amounts of at least the ethylene-1-octene copolymer, more preferably in their weight amounts of all of ethylene monomer, 1-octene monomer and ethylene-1-octene copolymer.

It is preferred that in the at least two model compositions one model composition has a weight amount of ethylene-1-octene copolymer at the lower end of the preferred range and one model composition has a weight amount of ethylene-1-octene copolymer at the higher end of the preferred range. The lower end of the preferred range thereby is preferably in the range of from 5 wt % to 25 wt %, more preferably in the range of from 7.5 wt % to 22 wt % and most preferably in the range of from 10 wt % to 20 wt %. The upper end of the preferred range thereby is preferably in the range of from more than 25 wt % to 45 wt %, more preferably in the range of from 28 wt % to 42 wt % and most preferably in the range of from 30 wt % to 40 wt %.

The cloud points of said model compositions are preferably determined by varying one of the parameters of temperature and pressure of each model composition, while keeping the other of said parameters constant and detecting phase separation. Thereby, in one embodiment a temperature is selected as constant parameter and the pressure of the model composition is increased and reduced.

In another embodiment a pressure is selected as constant parameter and the temperature of the model composition is increased and reduced.

Phase separation can be detected by means of visual determination methods such as a Cailletet apparatus as discussed e.g. in Nagy et al., High pressure phase equilibria in the systems linear low density polyethylene+n-hexane and linear low density polyethylene+n-hexane+ethylene: Experimental results and modelling with the Sanchez-Lacombe equation of state, J. of Supercritical Fluids 37 (2006) 115-124 and Nagy et al., High-pressure phase equilibria in the system linear low density polyethylene+isohexane: Experimental results and modelling, J. of Supercritical Fluids 40 (2007) 125-133, or an optical variable volume cell as discussed e.g. in Chen et al., Density-Tuned Polyolefin Phase Equilibria. 2. Multicomponent Solutions of Alternating Poly(ethylene-propylene) in Subcritical and Supercritical Olefins. Experiment and SAFT Model, Macromolecules 25 (1992). 4987-4995 and Chen et al. Density-Tuned Polyolefin Phase Equilibria. 1. Binary Solutions of Alternating Poly(ethylene-propylene) in Subcritical and Supercritical Propylene, 1-Butene and 1-Hexene. Experiment and Flory-Patterson Model, Macromolecules 25 (1992), 3089-3096 or an optical high-pressure cell as discussed e.g. in de Loos et al., Fluid Phase Equilibria in the System Polyethylene+Ethylene. Systems of Linear Polyethylene+Ethylene in High Pressure, Macromolecules 16 (1983), 111-117.

Phase separation can also be detected by means of light scattering technology as discussed e.g. in Folie et al., Phase Equilibria in High-pressure Polyethylene Technology, Ind. Eng. Chem. Res. 34 (1996), 1501-1516 or Szydlowski et al. A new apparatus for the detection of phase equilibria in polymer solvent systems by light scattering, Rev. Sci. Instrum. 63 (1992) 1717-1725.

These methods are well established in the art for determining phase separation in polyethylene systems and are equally suitable for determining phase separation in the method of the present invention.

Preferably, the cloud points are determined for the model compositions of one ethylene-1-octene copolymer grade over a temperature span of from 100° C. to 250° C., more preferably over a temperature span of from 110° C. to 250° C., still more preferably over a temperature span of from 150° C. to 220° C.

Thereby, for each of the two or more different model compositions of one ethylene-1-octene copolymer grade the cloud points can be determined over narrower temperature spans. It is, however, preferred that the temperature spans of the two or more different model compositions of one ethylene-1-octene copolymer grade overlap to the overall temperature span of from 100° C. to 250° C.

The temperature span of from 100° C. to 250° C. ensures that the usual range of temperatures which occur during the solution polymerization process and the downstream separation steps is covered by the determined cloud points. This allows a more accurate prediction of phase separation in the method of the present invention.

It is preferred that for the model compositions of one ethylene-1-octene copolymer grade five or more, preferably six or more, more preferably seven or more and most preferably 8 or more cloud points are determined. The upper limit of the number of cloud point to be determined is usually not higher than 20. These cloud points are preferably determined over the above mentioned temperature range.

From the determined cloud points a correlation for interpolating cloud points for compositions of said specific ethylene-1-octene copolymer grade comprising ethylene monomer, 1-octene monomer, ethylene-1-octene copolymer of said specific grade and solvent with different weight amounts of at least one of the ethylene monomer, 1-octene monomer, ethylene-1-octene copolymer of said specific grade is developed.

By means of such a correlation it is possible to predict cloud points and as a consequence phase separation for compositions of said specific ethylene-1-octene copolymer grade with different weight amounts of at least one of the ethylene monomer, 1-octene monomer, ethylene-1-octene copolymer of said specific grade at different process temperatures and/or process pressures. These weight amounts are thereby the weight amounts of the ethylene monomer, 1-octene monomer and ethylene-1-octene copolymer of said specific grade of the different model compositions.

Such a correlation is usually a mathematical correlation.

Usually such correlations are established from models selected from free energy models, equation of state (EoS) models or polynomial models.

Free energy models or also known as activity coefficient models are models in which the activity coefficients of the components in a system are estimated. Activity coefficients are correlation factors that account for deviations of real systems from that of an ideal solution (solution with thermodynamic properties analogous to this of a mixture of ideal gases, in which the enthalpy of mixing is zero, the vapor pressure obeys Raoult's law and the activity coefficient of each component is one). Suitable free energy models are Flory-Huggins, UNIFAC and their modifications. Flory-Huggins is a lattice model, which is based on a theory where fluids are mixtures of molecules and holes that are bonded to sites on a lattice. This model is especially suitable for modeling polymer systems, but has its flaws especially when the polymer is in supercritical fluid at high pressure (Flory, Thermodynamics of Heterogeneous Polymers and Their Solutions, J. Chem. Phys. 12 (1944) 425-438, Maloney et al. Solubility of Ethylene in Liquid, Low-Density Polyethylene at Industrial-Separation Pressures, Ind. Eng. Chem., Process Des. Dev., 15 (1976) 2016-220).

UNIFAC (UNIQUAC Functional-group Activity Coefficients) is a semi-empirical system for the prediction of non-electrolyte activity in non-ideal mixtures. UNIFAC uses the functional groups present on the molecules that make up the liquid mixture to calculate activity coefficients. By using interactions for each of the functional groups present on the molecules, as well as some binary interaction coefficients, the activity of each of the solutions can be calculated, whereby the activity coefficient is split up into a combinatorial term and a residual term. Several modifications of the UNIFAC model were developed such as new-UNIFAC, modified Flory-Huggins or entropic FV, which differ in the form of the combinatorial term or residual term, or alternatively by the type of parameter table they use (UNIFAC and related group-contribution models for phase equilibria, Fluid Phase Equilibria 52 (1989) 135-150, Kontogeorgis et al., Prediction of Liquid-Liquid Equilibrium for Binary Polymer Solutions with Simple Activity Coefficient Models, Ind. Eng. Chem. Res. (1995) 1823-1834).

The most suitable free energy model is the entropic FV model which accurately can predict cloud points on the LCST curve.

Equation of state (EoS) models such as Sanchez-Lacombe, polymer Sako-Wu-Prausnitz (SWP), statistical associating fluid theory (SAFT) and its modifications such as perturbed chain SAFT (PC-SAFT) or perturbed hard sphere chain (PHSC) are typically used for estimating thermodynamic properties of polymer systems (Pedrosa et al. Phase Equilibria Calculations of Polyethylene Solutions from SAFT-Type Equations of State, Macromolecules 39 (2006), 4240-4246).

Sanchez-Lacombe is a lattice fluid model and an extension of the Flory-Huggins theory and the free volume concept is included to this compressible lattice model. In contrary to the Flory-Huggins model the vacant sites are occupied by additional components. This model was used for modelling polyethylene+ethylene and polyethylene+n-hexane systems and fit well with the experimental cloud point data (Gauter et al., Modeling polyethylene-solvent mixtures with the Sanches-Lacombe equation, Fluid Phase Equilibria 183-184 (2001) 87-97).

SWP is a cubic equation of state (EoS) model, which can be applied for modelling polymer solutions which is based on an equation in which the pressure depends on the gas constant, the molar volume and three pure component parameters. These component parameters are correlated to physical properties of the components. The SWP equation of state model is applicable e.g. to high pressure polyethylene technology such as the high pressure polymerization of LDPE (Tork et al., Modelling of high-pressure phase equilibria using Sako-Wu-Prausnitz equation of state I. Pure-components and heavy n-alkane solutions, Fluid phase Equilibria 163 (1999) 61-77, Tork et al., Modelling of high-pressure phase equilibria using Sako-Wu-Prausnitz equation of state II. Vapour-liquid equilibria and liquid-liquid equilibria in polyolefin systems, Fluid phase Equilibria 163 (1999) 79-98).

PHSC is an equation of state (EoS) hard-sphere model, which is based on the thermodynamic perturbation theory. PHSC utilizes a reference fluid that consists of hard spheres in chains and was further developed based on the Chiew EoS model for a thermal hard-sphere chains and van der Waals type perturbation term (Song et al. Liquid-Liquid Phase Diagrams for Binary Polymer Solutions from a Perturbed Hard-Sphere-Chain Equation of State, Chemical Engineering Science 47 (1994) 2765-2775). PHSC has the advantage that the segment diameters in a chain molecules do not have to be equal which allows modelling of LCST curves for binary mixtures that contain copolymers in which the spheres have different diameters. SAFT is also an equation of state (EoS) hard-sphere model, which is based on the thermodynamic perturbation theory. SAFT is rather similar to PHSC but uses the so-called cluster integral approximation and is algebraically more complicated than PHSC. SAFT includes particularly the intramolecular association, the chain length and branching along with the repulsion and dispersion forces. In SAFT the molecules are a sum of three different terms, the reference term, the chain term and the association term. SAFT is applicable for chain like molecules. The SAFT model has many different modifications such as polar-SAFT, SAFT-HS, simplified SAFT, SAFT-LJ, copolymer SAFT, soft-SAFT, SAFT-VR, SAFT1, SAFT-BACK crossover SAFT and PC-SAFT. These modifications mainly differ in the used reference term (Pedrosa et al. Phase Equilibria Calculations of Polyethylene Solutions from SAFT-Type Equations of State, Macromolecules 39 (2006), 4240-4246).

In PC-SAFT the reference term is a hard chain fluid instead of a hard sphere fluid. As a consequence a new dispersion term was developed which is dependent on the chain length of the polymer molecule. PC-SAFT has been used for modelling copolymer systems (Gross et al., Perturbed-chain SAFT: An Equation of State Based on a Perturbation Theory for Chain Molecules, Ind. Eng. Chem. Res. 40 (2001) 1244-1260, Gross et al. Modeling Copolymer Systems Using the Perturbed-Chain SAFT Equation of State, Ind. Eng. Chem. Res. 42 (2003) 1266-1274).

The most suitable EoS model is the PC-SAFT model which accurately can predict cloud points on the LCST curve of copolymer systems.

Polynomial models use polynomial regression in which the relationship between the independent variable x and the dependent variable y is modelled as an nth degree polynomial in x. Polynomial regression fits a nonlinear relationship between the value of x and the corresponding conditional mean of y, denoted $E(y|x)$. In the method of the present invention polynomial regression can be used to fit the relationship of the LCST with the cloud point pressure as $E(p|T)$ for modeling LCST curves.

Thereby it is preferred that the polynomial model is developed from the trend lines of the determined cloud points.

Preferably, in such a correlation the cloud point pressure is given as a polynomial function of the temperature and the weight amount of ethylene-1-octene copolymer. In a binary system such as a P,T diagram it is thereby preferred that several polynomial functions are given as P,T polynomial function whereby each P,T polynomial function represents the function for a given weight amount of ethylene-1-octene copolymer.

In the present invention all different models as discussed above can be used for interpolating cloud points from the cloud points determined for said model compositions.

It is preferred that the model is used for establishing binary P,T curves of cloud point pressures at given LCSTs for different weight ratios of ethylene-1-octene copolymer. In another embodiment the model is used for establishing tertiary P,T,wt % curves of cloud point pressures at given LCSTs and weight ratios of ethylene-1-octene copolymer.

It is preferred that a polynomial model is used for establishing correlations for interpolating cloud points from the cloud points determined for said model compositions.

In the process of the present invention phase separation for said specific ethylene octene copolymer grade is predicted by interpolating the cloud points from said correlation for a composition of said specific ethylene-1-octene copolymer grade comprising ethylene monomer, 1-octene monomer, ethylene-1-octene copolymer of said specific grade with given weight amounts of at least one of ethylene monomer, 1-octene monomer, ethylene-1-octene copolymer.

The composition of said specific ethylene-1-octene copolymer grade usually is the polymerization composition of said specific ethylene-1-octene copolymer grade in one of the different stages of the solution polymerization process such as the polymerization stage in the solution polymerization reactor or the post-reactor stages such as the down-stream heat exchanger.

The polymerization composition usually comprises ethylene monomer, 1-octene monomer, ethylene-1-octene copolymer of said specific grade, solvent, polymerization catalyst and optional other components such as chain transfer agent.

The solvent is preferably a liquid hydrocarbon solvent, more preferably a $C_{5-12}$-hydrocarbon which may be unsubstituted or substituted by $C_{1-4}$ alkyl group such as pentane, methyl pentane, hexane, heptane, octane, cyclohexane, methylcyclohexane and hydrogenated naphtha. More preferably unsubstituted $C_6$-$C_{10}$-hydrocarbon solvents are used.

The solvent can also comprise mixtures of said hydrocarbon solvents.

The given weight amounts of ethylene monomer, 1-octene monomer, ethylene-1-octene copolymer are suitably those of the polymerization composition in one of said different stages of the solution polymerization process, which is of interest, such as the polymerization stage in the solution polymerization reactor or the post-reactor stages such as the down-stream heat exchanger.

The amount of ethylene-1-octene copolymer in the polymerization composition is preferably in the range of from 14 wt % to 30 wt %, more preferably in the range of from 15 to 28 wt % and most preferably in the range of from 17 to 25 wt %, based on the total amount of the polymerization composition.

The amount of ethylene monomer in the polymerization composition is preferably in the range of from 0.1 wt % to 5.0 wt %, more preferably in the range of from 0.5 to 4.0 wt %, most preferably in the range of from 0.8 to 3.0 wt %, based on the total amount of the polymerization composition.

The amount of 1-octene monomer in the polymerization composition is preferably in the range of from 1.0 wt % to 30.0 wt %, more preferably in the range of 2.0 to 25.0 wt %, and most preferably in the range of from 2.5 wt % to 21.0 wt %, based on the total amount of the polymerization composition.

It is preferred that the weight amount of the ethylene-1-octene copolymer is given.

It is preferred that phase separation is predicted using the developed model for different weight amounts of ethylene-1-octene copolymer over a temperature span of from 100° C. to 250° C.

The correlation can thereby be selected for the binary P,T curves for given weight ratios of ethylene-1-octene copolymer or the tertiary P,T,wt % curves as discussed above.

Thereby, it is preferred that the binary P,T curves for given weight ratios of ethylene-1-octene copolymer is used.

In said binary P,T system for each weight ratios of ethylene-1-octene copolymer a distinct P,T curve is given which represents the modelled LCST curve of the composition of said specific ethylene-1-octene copolymer grade at a given weight ratios of ethylene-1-octene copolymer.

From said modelled LCST curve the cloud point pressure at a given temperature, such as the polymerization temperature in the solution polymerization reactor or the temperature in the downstream heat exchanger of the solution polymerization process can be predicted for a composition with a given weight amount of ethylene-1-octene copolymer. For establishing a single phase system at said given temperature and weight amount of ethylene-1-octene copolymer the pressure needs to be maintained above the cloud point pressure.

Alternatively, from said modelled LCST curve the LCST at a given pressure, such as the polymerization pressure in the solution polymerization reactor or the pressure in the downstream heat exchanger of the solution polymerization process can be predicted for a composition with a given weight amount of ethylene-1-octene copolymer. For establishing a single phase system at said given pressure and weight amount of ethylene-1-octene copolymer the temperature needs to be maintained below the LCST.

The process further comprises the step of d) Selecting pressure and temperature conditions, which in the predicted phase separation data show that the ethylene-1-octene copolymer is completely solved in the solvent.

During the solution polymerization process of the ethylene-1-octene copolymer the process conditions, suitably temperature, pressure and polymer concentration in the at least one solution polymerization reactor and optionally the downstream process steps such as the downstream heat exchanger, are preferably monitored. When a change of one of said process conditions is observed the process conditions need to be adjusted to ensure that the single phase liquid system in the solution polymerization process is maintained.

The pressure and temperature conditions in process step d) are preferably selected for the given polymerization system of solution polymerization process using the polymer concentration, ethylene monomer amount and 1-octene monomer amount in the actual solution polymerization process.

The process further comprises the step of e) Adjusting at least one parameter selected from the process temperature and pressure in at least one solution polymerization reactor, and optionally the first heat exchanger downstream from the at least one solution polymerization reactor, to said selected pressure and temperature conditions during a solution polymerization process of an ethylene-1-octene copolymer of said specific grade.

By means of process step e) the single phase liquid system in the solution polymerization process can be maintained also during condition changes which ensures that the ethylene-1-octene copolymer is completely solved in the solvent.

In the process of the present invention phase separation caused by any kind of conditions changes can be predicted in any stage of the solution polymerization process of a specific ethylene-1-octene copolymer grade and avoided by adjustment step d).

In the process of the invention smooth operation of the solution polymerization process can be ensured by predicting the conditions in the reactor and the downstream stages such as the heat exchanger, which guarantee a single phase system of the polymerization composition.

Consequently, consequences of disturbances during polymerization process, such as e.g. poisoning of the polymerization catalyst by impurities, causing a drop of polymer concentration, or a sudden pressure drop, can be predicted and even avoided.

Control strategies for such disturbances can be developed from these predictions. The process of the present invention can also be used for predicting polymerization conditions of new ethylene-1-octene copolymer grades, especially those which have comparable properties to already established ethylene-1-octene copolymer grades.

In one embodiment the process of the present invention as described herein can be used for controlling and adjusting the polymerization parameters selected from polymerization temperature and polymerization reactor in the polymerization reactor and the downstream stages such as the heat exchanger directly in the polymerization reactor.

In another embodiment the process parameters can also be adjusted at another stage of the solution polymerization process, such as a downstream stage of the solution polymerization process.

As briefly discussed above in a solution polymerization process the monomer feeds are introduced together with feeds for catalyst, solvent and possible other components into a solution polymerization reactor in which the ethylene-1-octene copolymer is polymerized at set polymerization temperature and pressure to ensure single phase polymerization. Downstream of the polymerization reactor the single phase polymerization composition comprising the ethylene-1-octene copolymer, unreacted monomers and solvent are passed through a heat exchanger and a valve for adjusting temperature and pressure to obtain phase separation into a polymer-poor and a polymer-rich phase which are then separated in a separator. Downstream of the separator several purification steps occur for obtaining the ethylene-1-octene copolymer and recycling the unreacted monomers and solvent.

Controlling and adapting the polymerization temperature and pressure directly in the reactor can become complicated as e.g the polymerization temperature in the polymerization reactor are affected by different process variables such as inlet feed temperatures to the reactor, catalyst feed or polymer properties.

In the present embodiment such difficulties can be avoided by adjusting at least one parameter selected from the process temperature and pressure at another stage of the solution polymerization process such as a stage downstream of the polymerization reactor.

Suitable stages are for example the heat exchanger downstream of the polymerization reactor but upstream of the separator for adjusting the process temperature while maintaining the process pressure or the valve downstream of the polymerization reactor but upstream of the separator for adjusting the process pressure while maintaining the process temperature. Preferably, the process pressure is adjusted by the valve downstream of the polymerization reactor but upstream of the separator while maintaining the process temperature.

Further, the present invention relates to the use of a correlation for interpolating cloud points from the cloud points on the LCST curve determined for two or more model compositions of a specific ethylene-1-octene copolymer grade comprising ethylene monomer, 1-octene monomer, ethylene-1-octene copolymer of a specific grade and solvent, whereby the model compositions differ in their weight amounts of at least one of ethylene monomer, 1-octene monomer, ethylene-1-octene copolymer for adjusting at least one of the parameters selected from the process temperature and pressure, and maintaining a single phase liquid system during a solution polymerization process for polymerizing an ethylene-1-octene copolymer of said specific grade.

Preferably said correlation is used for adjusting at least one of the parameters selected from process pressure and temperature during a solution polymerization process of an ethylene-1-octene copolymer of said specific grade to maintain a single phase liquid system at a given weight amount of said ethylene-1-octene copolymer in the polymerization composition based on the predicted phase separation for said specific ethylene-1-octene copolymer grade.

Thereby, the correlation, the model compositions and the compositions preferably are defined as described above or below.

Further, the specific ethylene-1-octene copolymer grade preferably relates to the ethylene-1-octene copolymer grade polymerized in solution polymerization as described above or below.

EXAMPLES

A) Controlling the Process Parameters of an Exemplary Ethylene-1-Octene Copolymer in the Polymerization Reactor For illustrating the invention and the application of the invention an exemplary ethylene-1-octene copolymer is polymerized in a high temperature solution copolymerization process by copolymerizing ethylene and 1-octene in the presence of a polymerization catalyst in a solvent.

The process can be generally described as follows:

Ethylene and 1-octene are absorbed in the solvent, with the removal of the heat of absorption in a deep cooling unit. From the cooler, the monomer-comonomer solutions are fed to the reactor. The catalyst is fed separately to the reactor. The polymerization is carried out in an agitated, completely liquid-filled vessel under adiabatic conditions. The heat of reaction is absorbed by the pre-cooled reactor feed. The reactor operates at a temperature between 130 and 250° C. and a pressure between 30 and 150 bar. The residence time is less than 10 minutes. Ethylene conversion is maximum 96 percent per pass.

Figure 2:
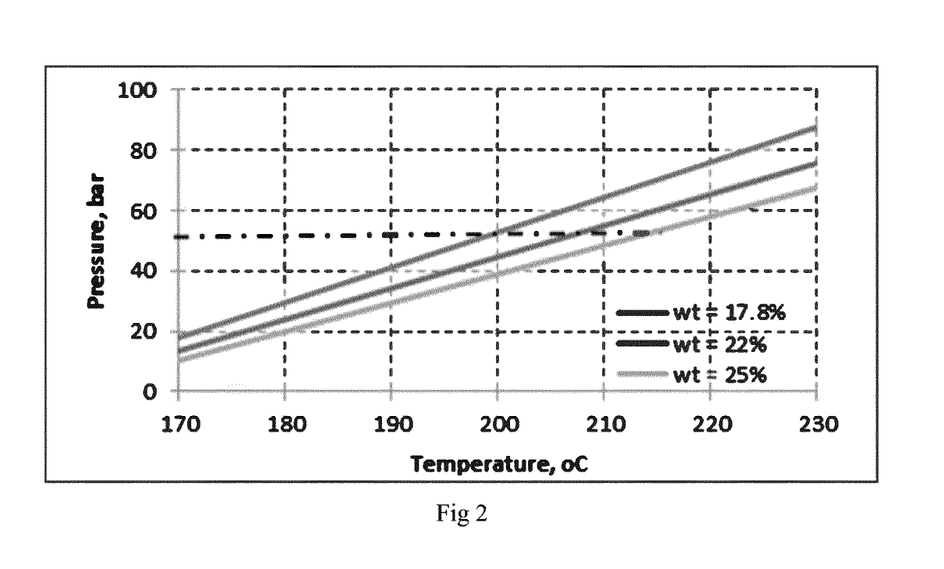
FIG. 2 shows a P,T diagram for the polymerization of an exemplary ethylene-1-octene copolymer in a solution process showing interpolated cloud point curves for compositions comprising 17.8 wt % (upper curve in blue), 22 wt % (middle curve in red) and 25% (lower curve in green) of said exemplary ethylene-1-octene copolymer in the composition.

For said process the cloud points of model compositions are determined as described in the general description over the above described temperature and pressure ranges whereby in the model compositions the weight amount of ethylene-1-octene copolymer is varied whereas the weight amounts of ethylene and 1-octene in the solvent are kept constant. Said model compositions consist of ethylene, 1-octene, ethylene-1-octene copolymer and solvent and thus relate to idealized polymerization compositions, for which the influence of other minor components of the real polymerization compositions in the reactor, such as the catalyst, oligomers, chain transfer agents, if present, and so on, on the cloud points are neglected. From said cloud points of the model compositions correlations are established by using one of the models as described in the general description and cloud point curves for the different compositions over the temperature and pressure range are established. FIG. 2 shows the correlated cloud point curves for the compositions of the exemplary ethylene-1-octene copolymer compositions comprising 17.8 wt % (upper curve in blue), 22 wt % (middle curve in red) and 25% (lower curve in green) of said exemplary ethylene-1-octene copolymer in the composition. The cloud point curves thereby show the temperature and pressure conditions under which phase separation occurs. The area above the respective curve shows the single phase area, whereas the area below the respective curve shows the two phase area.

Example 1: Steady-State Polymerization

For the exemplary ethylene-1-octene grade the usual polymerization temperature is set to 200° C. and under steady state polymerization conditions a polymer concentration of the exemplary ethylene-1-octene copolymer in the solution reactor is about 22 wt %. This means that for ensuring polymerization in single phase inside the reactor the pressure in the reactor needs to maintained above the pressure of cloud point of said exemplary ethylene-1-octene copolymer at a concentration of 22 wt % and 200° C. in the middle (red) curve in FIG. 2, which is at least about 45 bar, such as e.g. 47 bar.

Example 2: Disturbances in the Polymerization System

In a second example the polymer concentration inside the reactor is reduced to about 17.8 wt % due to disturbances in the system, such as impurities affecting the catalyst activity.

As a consequence the cloud point curve is shifted to the left in FIG. 2 (upper blue curve for an ethylene-1-octene-copolymer concentration of 17.8 wt %) and narrows the stable operation window of the single phase operation. For a polymerization temperature of 200° C. and a polymerization pressure of 47 bar, which allows stable single phase polymerization of the exemplary ethylene-1-octene copolymer at a copolymer concentration of about 22 wt %, a drop of copolymer concentration to about 17.8 wt % results in phase separation as for the concentration of 17.8 wt % the cloud point pressure rises to about 52 bar at a temperature of 200° C. (see FIG. 2). Consequently, for the selected polymerization temperature of 200° C., the single phase inside the reactor is dissociated into two phases which negatively affects the polymerization reaction and might end up with a shut down.

Thus, in order to re-establish steady state polymerization conditions and avoid shut down the pressure in the reactor must be temporarily increased to a pressure of at least 52 bar until the usual copolymer concentration of about 22 wt % is re-established.

B) Controlling the Process Pressure of an Exemplary Ethylene-1-Octene Copolymer by the Valve Downstream of the Polymerization Reactor For illustrating the invention and the application of the invention an exemplary ethylene-1-octene copolymer is polymerized in a high temperature solution copolymerization process by copolymerizing ethylene and 1-octene in the presence of a polymerization catalyst in a solvent.

Figure 3:
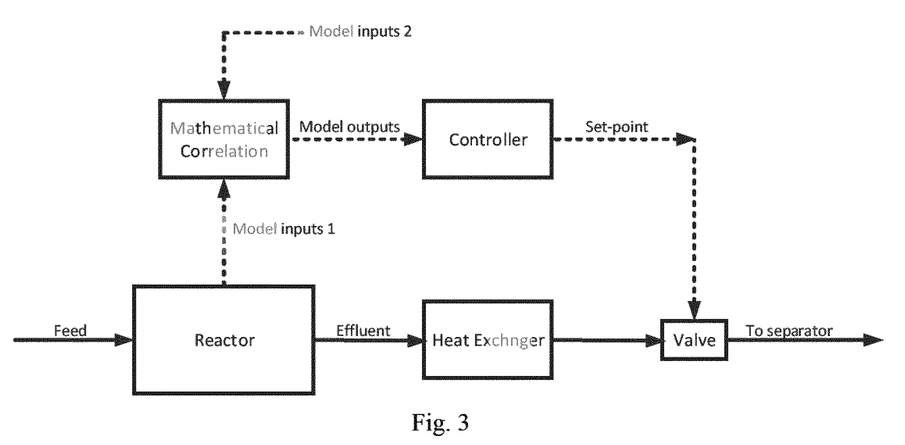
FIG. 3 shows a flowsheet of a solution polymerization process and the possibility to adjust the polymerization parameters by adjusting the pressure in the downstream flash valve.

The process can be generally described as follows:

Ethylene and 1-octene are absorbed in the solvent, with the removal of the heat of absorption in a deep cooling unit. From the cooler, the monomer-comonomer solutions are fed to the reactor. The catalyst is fed separately to the reactor. The polymerization is carried out in an agitated, completely liquid-filled vessel under adiabatic conditions. The heat of reaction is absorbed by the pre-cooled reactor feed. The reactor operates at a temperature between 130 and 250° C. and a pressure between 30 and 150 bar. The residence time is less than 10 minutes. Ethylene conversion is maximum 96 percent per pass. After withdrawal from the solution polymerization reactor the polymerization composition pass a heat exchanger and a flash valve for adjusting the temperature and pressure of the polymerization composition to obtain phase separation and separate the single phase composition in a polymer-rich phase and a polymer-poor phase. In a downstream separator the two phases are separated. A flowsheet of said process in shown in FIG. 3.

Figure 4:
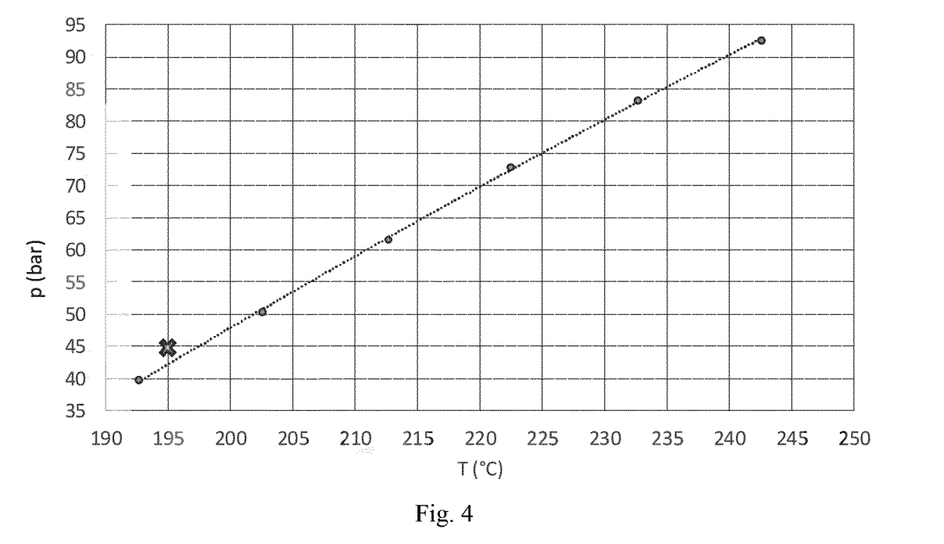
FIGS. 4 and 5 show a P,T diagram for the polymerization of an exemplary ethylene-1-octene copolymer in a solution process showing interpolated cloud point curves for compositions comprising 14 wt % of said exemplary ethylene-1-octene copolymer in the composition.

For said process the cloud points of model compositions are determined as described in the general description over the above described temperature and pressure ranges whereby in the model compositions the weight amount of ethylene-1-octene copolymer is varied whereas the weight amounts of ethylene and 1-octene in the solvent are kept constant. From said cloud points of the model compositions correlations are established by using one of the models as described in the general description and cloud point curves for the different compositions over the temperature and pressure range are established. FIG. 4 shows the correlated cloud point curves for the compositions of the exemplary ethylene-1-octene copolymer compositions comprising 14 wt % of said exemplary ethylene-1-octene copolymer in the composition. The cloud point curves thereby show the temperature and pressure conditions under which phase separation occurs. The area above the respective curve shows the single phase area, whereas the area below the respective curve shows the two phase area.

Example 3: Steady-State Polymerization

For the exemplary ethylene-1-octene grade the usual polymerization pressure is set to 45 bar, whereas, the temperature varies depending on the grade. For the polymerization of an exemplary ethylene-1-octene with a density of 880 kg/m$^3$ and a MFR2 of 85 g/10 min under steady state polymerization conditions a polymer concentration of the exemplary ethylene-1-octene copolymer in the solution reactor is about 14 wt % and the polymerization temperature is about 195° C. as can be seen in FIG. 4, in which the x marks the polymerization conditions of 45 bar and 195° C. for a concentration of 14 wt % within the single phase area of the P,T diagram.

Example 4: Disturbances in the Polymerization System

In a second example an unexpected increase of the polymerization temperature is recorded due to a disturbance of the system, such as a sudden increase in the catalyst feed rate to the reactor. Said increase from steady state conditions A to conditions B are shown in the P,T diagram of FIG. 5. Thereby, it can be seen that the unexpected temperature increase shifts the operating conditions B into the undesired two phase area.

Figure 5:
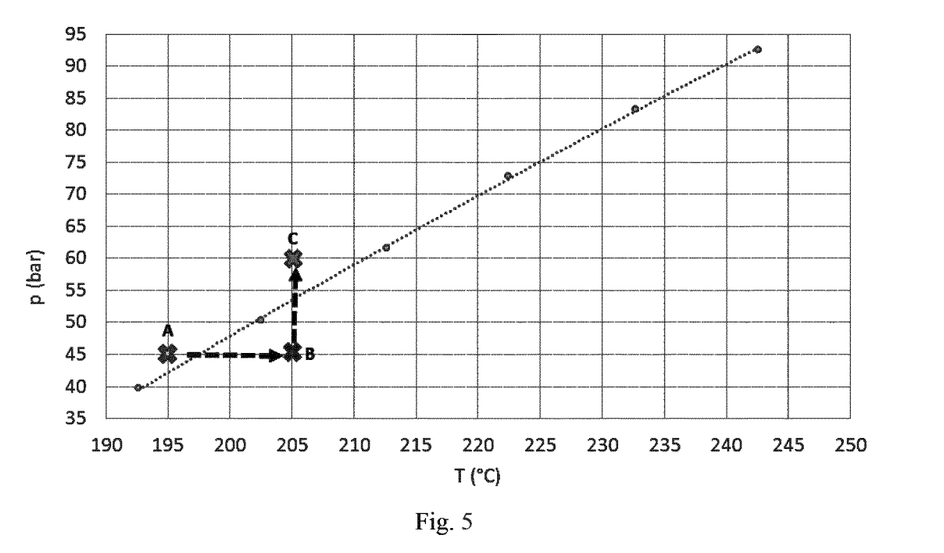

By now varying the opening of the flash valve downstream of the polymerization reactor (see FIG. 3) the pressure of the line is increased as such that upstream the pressure inside the reactor is increased to 60 bar so that the operation conditions in the reactor are shifted to operation point C in FIG. 5 and single phase state is restated in the polymerization reactor.

The invention claimed is:

1. A process for preparing an ethylene-1-octene copolymer in a solution polymerization process by modelling a polymer system for solution polymerization of ethylene monomer and 1-octene comonomer and then transferring temperature and pressure conditions from a modelled polymer system to a solution polymerization process, comprising the steps of
   a) determining a cloud point on a lower critical solution temperature LCST curve for each of two or more model compositions of a specific ethylene-1-octene copolymer grade comprising ethylene monomer, 1-octene monomer, ethylene-1-octene copolymer of a specific grade and solvent, wherein the two or more model compositions differ in their weight amounts of at least one of ethylene monomer, 1-octene monomer, and ethylene-1-octene copolymer of a specific grade;
   b) developing a correlation for interpolating cloud points for said two or more model compositions of an ethylene-1-octene copolymer of a specific grade comprising ethylene monomer, 1-octene monomer, ethylene-1-octene copolymer of a specific grade and solvent with different weight amounts of at least one of the ethylene monomer, 1-octene monomer, and ethylene-1-octene copolymer of a specific grade from cloud points determined for said two or more model compositions;
   c) predicting phase separation for said ethylene-1-octene copolymer of a specific grade by interpolating the cloud points from said correlation for two or more compositions of an ethylene-1-octene copolymer of a specific grade comprising ethylene monomer, 1-octene monomer, and ethylene-1-octene copolymer of a specific grade with given weight amounts of at least one of ethylene monomer, 1-octene monomer, and ethylene-1-octene copolymer of a specific grade;
   d) selecting temperature and pressure conditions, which in predicted phase separation data show that the ethylene-1-octene copolymer of a specific grade is completely solved in the solvent;
   e) adjusting at least one parameter selected from process temperature and pressure in at least one solution polymerization reactor, and optionally a first heat exchanger downstream from the at least one solution polymerization reactor, to a selected temperature and/or pressure condition during a solution polymerization process for preparing an ethylene-1-octene copolymer of a specific grade, and
   f) polymerizing ethylene monomer and 1-octene monomer in a solvent in said at least one solution polymerization reactor at an adjusted process temperature and/or pressure in the presence of a polymerization catalyst to obtain an ethylene-1-octene copolymer of a specific grade, which is completely solved in said solvent.

2. The process according to claim 1, wherein the cloud point on the LCST curve is determined by varying one of the parameters of temperature or pressure of each model composition, while keeping the other of said parameters constant and detecting phase separation.

3. The process according to claim 1, wherein a cloud point for each model composition is determined over a temperature span of from 150° C. to 250° C.

4. The process according to claim 1, wherein the weight amount of ethylene-1-octene copolymer of a specific grade in the two or more model compositions is in a range of from 10 wt % to 45 wt %, based on a total weight amount of the two or more model compositions.

5. The process according to claim 1, wherein the weight amount of ethylene monomer in the two or more model compositions is in a range of from 0.1 wt % to 5.0 wt %, based on a total weight amount of the two or more model compositions.

6. The process according to claim 1, wherein the weight amount of 1-octene monomer in the two or more model compositions is in a range of from 1.0 wt % to 30.0 wt %, based on a total weight amount of the two or more model compositions.

7. The process according to claim 1, wherein the two or more model compositions further comprise different weight amounts of nitrogen.

8. The process according to claim 1, wherein the correlation is established from models selected from free energy models, equation of state (EoS) models, or polynomial models.

9. The process according to claim 1, wherein the correlation is established from a polynomial model, which is developed from trend lines of determined cloud points.

10. The process according to claim 1, wherein the correlation is established from a polynomial model in which a cloud point pressure is given as a polynomial function of the temperature and weight amount of ethylene-1-octene copolymer of a specific grade.

11. The process according to claim 1, wherein phase separation is predicted using a developed correlation for different weight amounts of ethylene-1-octene copolymer of a specific grade over a temperature span of from 150 to 250° C.

12. The process according to claim 1, wherein the weight amounts of ethylene-1-octene copolymer of a specific grade are within a range of from 14 to 30 wt %, based on a total amount of the two or more compositions of an ethylene-1-octene copolymer grade of a specific grade.

13. The process according to claim 1, wherein the ethylene-1-octene copolymer of a specific grade is a linear low density ethylene-1-octene copolymer.

14. The process according to claim 1, wherein in step f) an adjusted process temperature is in a range of from higher than 100° C. to up to 250° C. and/or an adjusted process pressure is in a range of 10 to 300 bar.

* * * * *